(12) United States Patent
Wan et al.

(10) Patent No.: US 12,413,766 B2
(45) Date of Patent: Sep. 9, 2025

(54) METHOD FOR PICTURE PREDICTION, ENCODER, AND DECODER

(71) Applicant: GUANGDONG OPPO MOBILE TELECOMMUNICATIONS CORP., LTD., Guangdong (CN)

(72) Inventors: Shuai Wan, Dongguan (CN); Junyan Huo, Dongguan (CN); Yanzhuo Ma, Dongguan (CN); Wei Zhang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 312 days.

(21) Appl. No.: 17/483,507

(22) Filed: Sep. 23, 2021

(65) Prior Publication Data

US 2022/0014772 A1    Jan. 13, 2022

Related U.S. Application Data

(63) Continuation of application No. PCT/CN2019/110834, filed on Oct. 12, 2019.

(60) Provisional application No. 62/823,613, filed on Mar. 25, 2019.

(51) Int. Cl.
*H04N 19/50* (2014.01)
*H04N 19/186* (2014.01)

(52) U.S. Cl.
CPC .......... *H04N 19/50* (2014.11); *H04N 19/186* (2014.11)

(58) Field of Classification Search
CPC .... H04N 19/50; H04N 19/186; H04N 19/117; H04N 19/593; H04N 19/149; H04N 19/80; H04N 19/105; H04N 19/124; H04N 19/176; H04N 19/82
See application file for complete search history.

(56) References Cited

U.S. PATENT DOCUMENTS

| 2009/0238276 | A1  | 9/2009  | Har-Noy et al. |
| 2015/0043641 | A1  | 2/2015  | Gamei et al. |
| 2016/0219283 | A1* | 7/2016  | Chen .................... H04N 19/105 |
| 2017/0359595 | A1  | 12/2017 | Zhang et al. |

FOREIGN PATENT DOCUMENTS

| CA | 2964324 A1  | 5/2016 |
| CN | 106664425 A | 5/2017 |
| CN | 106717004 A | 5/2017 |
| CN | 107079157 A | 8/2017 |

(Continued)

OTHER PUBLICATIONS

International search report issued in corresponding international application No. PCT/CN2019/110834 dated Jan. 3, 2020.

(Continued)

*Primary Examiner* — Tat C Chio
(74) *Attorney, Agent, or Firm* — Perkins Coie LLP

(57) ABSTRACT

A method for picture prediction, an encoder, and a decoder are provided. The method includes the following. An initial predicted value of a colour component to-be-predicted of a current block in a picture is obtained through a prediction model. The initial predicted value is filtered and a target predicted value of the colour component to-be-predicted of the current block is obtained.

8 Claims, 6 Drawing Sheets

(56) References Cited

FOREIGN PATENT DOCUMENTS

| | | |
|---|---|---|
| CN | 107211124 A | 9/2017 |
| CN | 107580222 A | 1/2018 |
| CN | 109196867 A | 1/2019 |
| EP | 2046052 A2 | 4/2009 |
| EP | 2753078 A1 | 7/2014 |
| JP | 2010507335 A | 3/2010 |
| JP | 2015515236 A | 5/2015 |
| JP | 2018152989 A | 9/2018 |
| WO | 2008048489 A2 | 4/2008 |
| WO | 2013160696 A1 | 10/2013 |
| WO | 2015196117 A1 | 12/2015 |
| WO | 2016066028 A1 | 5/2016 |
| WO | 2017059926 A1 | 4/2017 |
| WO | 2018070914 A1 | 4/2018 |
| WO | 2018132710 A1 | 7/2018 |
| WO | 2019004283 A1 | 1/2019 |
| WO | 2020036130 A1 | 2/2020 |

OTHER PUBLICATIONS

Communication pursuant to Article 94(3)EPC issued in corresponding EP application No. 19922170.6 dated Jan. 13, 2023. 7 pages.

Notice of allowance issued in corresponding CN application No. 202111096320.8 dated Jan. 20, 2023. 8 pages with English translation.

Extended European search report issued in corresponding European application No. 19922170.6 dated Apr. 22, 2022. 10 pages.

First examination report issued in corresponding IN application No. 202117047020 dated Mar. 21, 2022. 6 pages with English translation.

Kai Zhang et al: "Enhanced Cross-Component Linear Model for Chroma Intra-Prediction in video Coding", IEEE Transactions on Image Processing, Aug. 2018, pp. 3983-3997.

Zhou Yun et al. "Research on the latest development of VVC standard for international video coding" Sep. 15, 2018; Radio and Television Technology, vol. 45, No. 9. 16 pages with English translation.

The first office action issued in corresponding CN application No. 202111096320.8 dated Sep. 29, 2022. 13 pages with English translation.

Office action issued in corresponding ID application No. P00202108516 dated Sep. 25, 2023. (6 pages with translation).

Notice of reasons for refusal issued in corresponding JP application No. 2021-557118 dated Nov. 7, 2023. (12 pages with translation).

Notice of reasons for refusal issued in corresponding JP application No. 2024-069934 dated Jan. 28, 2025. 14 pages (with English translation).

Kai Zhang, et al. "Enhanced Cross-component Linear Model Intra-prediction", Qualcomm Incorporated, Document: JVET-D0110, Joint Video Exploration Team (JVET) of ITU-T SG 16 WP 3 and ISO/IEC JTC 1/SC 29/WG 11 4th Meeting: Chengdu, CN, Oct. 15-21, 2016. 6 pages.

Notice of preliminary rejection issued in corresponding KR application No. 10-2021-7032518 dated Apr. 3, 2025. 11 pages (with English translation).

* cited by examiner

METHOD FOR PICTURE PREDICTION, ENCODER, AND DECODER

CROSS-REFERENCE TO RELATED APPLICATION (S)

This application is a continuation of International Application No. PCT/CN2019/110834, filed on Oct. 12, 2019, which claims priority to U.S. Provisional Application No. 62/823,613, filed on Mar. 25, 2019, the disclosures of which are hereby incorporated by reference in their entireties.

TECHNICAL FIELD

This disclosure relates to the technical field of video coding, and particular to a method for picture prediction, an encoder, and a decoder.

BACKGROUND

In recent video coding standard, e.g., H.266/versatile video coding (VVC), cross-component prediction has been allowed. Cross-component linear model (CCLM) prediction is one of the typical cross-component prediction technologies. Through cross-component prediction technology, it is possible to predict one component (or its residual) through another component, such as prediction of a chroma component through a luma component, or vice versa. Prediction between chroma components is also possible.

Since different components have different statistical characteristics, there is a difference in the statistical characteristics of various components. However, in component prediction, the difference in the statistical characteristics of various components has not been considered in the related cross-component prediction technology, which leads to low prediction efficiency.

SUMMARY

According to a first aspect, a method for picture prediction is provided. The method is implemented in a decoder and includes the following.

An initial predicted value of a colour component to-be-predicted of a current block in a picture is obtained through a prediction model. The initial predicted value is filtered and a target predicted value of the colour component to-be-predicted of the current block is obtained.

According to a second aspect, a method for picture prediction is provided. The method is implemented in an encoder and includes the following.

An initial predicted value of a colour component to-be-predicted of a current block in a picture is obtained through a prediction model. The initial predicted value is filtered and a target predicted value of the colour component to-be-predicted of the current block is obtained.

According to a third aspect, an encoder is provided. The encoder includes a memory and a processor. The memory is configured to store computer programs than can be run on the processor. The processor, when running the computer programs, is configured to execute the method of the second aspect.

According to a fourth aspect, a decoder is provided. The decoder includes a memory and a processor. The memory is configured to store computer programs than can be run on the processor. The processor, when running the computer programs, is configured to execute the method of the first aspect.

DETAILED DESCRIPTION

To better understand features and technical contents of implementations, the implementations will be described in detail below with reference to the accompanying drawings. The attached drawings are merely for reference and description, but are not used to limit the implementations.

In a picture of a video, a first colour component, a second colour component, and a third colour component are generally used to indicate a coding block. The first colour component, the second colour component, and the third colour component are respectively a luma component, a blue chroma component, and a red chroma component. For example, the luma component is generally represented by a symbol Y, the blue chroma component is generally represented by a symbol Cb or U, and the red chroma component is generally represented by a symbol Cr or V. In this way, the picture can be expressed in the format of YCbCr or YUV.

In the implementations, the first colour component is a luma component, the second colour component is a blue chroma component, and the third colour component is a red chroma component, which is not limited herein.

To further improve decoding performance, a cross-component prediction technology based on cross-component linear model (CCLM) is provided in H.266/versatile video coding (VVC). Through the cross-component prediction technology based on CCLM, it is possible to achieve the prediction from the luma component to the chroma component, that is, the prediction from the first colour component to the second colour component, or from the first colour component to the third colour component. It is also possible to achieve the prediction from the chroma component to the luma component, that is, the prediction from the second colour component to the first colour component or from the third colour component to the first colour component. It is even possible to achieve the prediction between the chroma components, that is, the prediction from the second colour component to the third colour component or from the third colour component to the second colour component, and the like. In the following implementations, the prediction from the first colour component to the second colour component is taken as an example for description, but the technical solutions of the implementations can also be applied to the prediction of other colour components.

Figure 1:
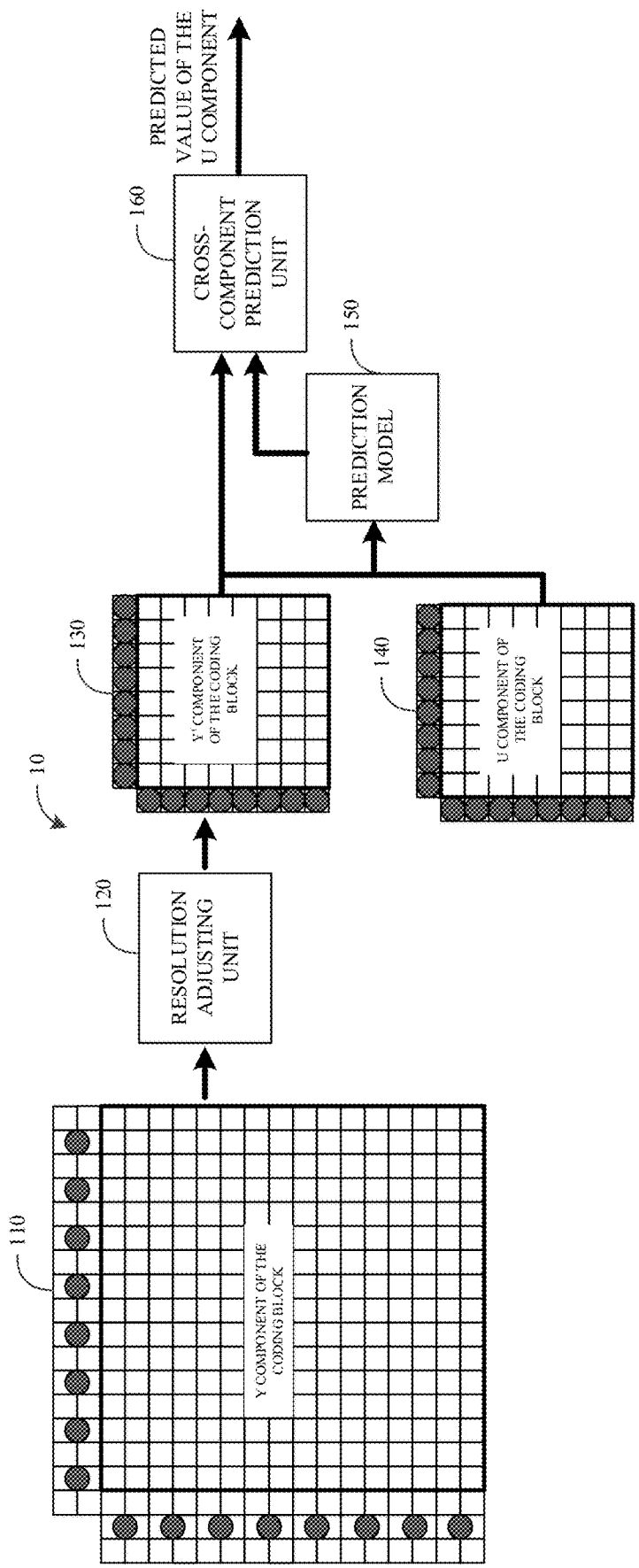
FIG. 1 is a schematic structural diagram of a related architecture for cross-component prediction according to related technical solutions.

FIG. 1 is a schematic structural diagram of a related architecture for cross-component prediction according to related technical solutions. As illustrated in FIG. 1, the first colour component (for example, represented by the Y component) is used to predict the second colour component (for example, represented by the U component). Assuming that the picture has the YUV format of 4:2:0, the Y component and the U component have different resolutions. In this case, it is necessary to perform down-sampling on the Y component or up-sampling on the U component, to obtain a target resolution of the component to-be-predicted, so that the prediction can be performed at the same resolution between the components. In this example, the way of prediction of the third colour component (for example, represented by the V component) using the Y component is similar.

In FIG. 1, the related architecture 10 for cross-component prediction includes a Y component 110 of a coding block, a resolution adjusting unit 120, a $Y^1$ component 130 of the coding block, a U component 140 of the coding block, a prediction model 150, and a cross-component prediction unit 160. The Y component of the picture is represented by the Y component 110 of the coding block with a size of 2N×2N. Herein, the larger bolded box is used to highlight the Y component 110 of the coding block and the surrounding gray solid circles are used to indicate neighbouring reference values of the Y component 110 of the coding block. The U component of the picture is represented by the U component 140 of the coding block with a size of N×N. Herein, the larger bolded box is used to highlight the U component 140 of the coding block and the surrounding gray solid circles are used to indicate neighbouring reference values of the U component 140 of the coding block. Since the Y component and the U component have different resolutions, the resolution adjusting unit 120 needs to adjust the resolution of the Y component, to obtain the $Y^1$ component 130 of the coding block with a size of N×N. For the $Y^1$ component 130 of the coding block, herein, the larger bolded box is used to highlight the $Y^1$ component 130 of the coding block and the surrounding gray solid circles are used to indicate neighbouring reference values Y'(n) of the $Y^1$ component 130 of the coding block. Then, the prediction model 150 can be constructed using the neighbouring reference values $Y^1$(n) of the $Y^1$ component 130 of the coding block and the neighbouring reference values C(n) of the U component 140 of the coding block. According to reconstructed sample values of the $Y^1$ component 130 of the coding block and the prediction model 150, component prediction can be performed by the cross-component prediction unit 160, and finally a predicted value of the U component is output.

For the related architecture 10 for cross-component prediction, in colour component prediction, some certain factors are not considered, for example, the difference in statistical characteristics of various colour components is not considered, which leads to low prediction efficiency. To improve the prediction efficiency, a method for picture prediction is provided in the implementations. An initial predicted value of a colour component to-be-predicted of a current block in a picture is obtained through a prediction model. The initial predicted value is filtered and a target predicted value of the colour component to-be-predicted of the current block is obtained. In this way, after cross-component prediction is performed on the at least one colour component of the current block, the least one colour component is filtered, to balance the statistical characteristics of various colour components after cross-component prediction, thereby improving the prediction efficiency as well as the coding efficiency in video coding.

The following will describe the implementations in conjunction with the accompanying figures.

Figure 2:
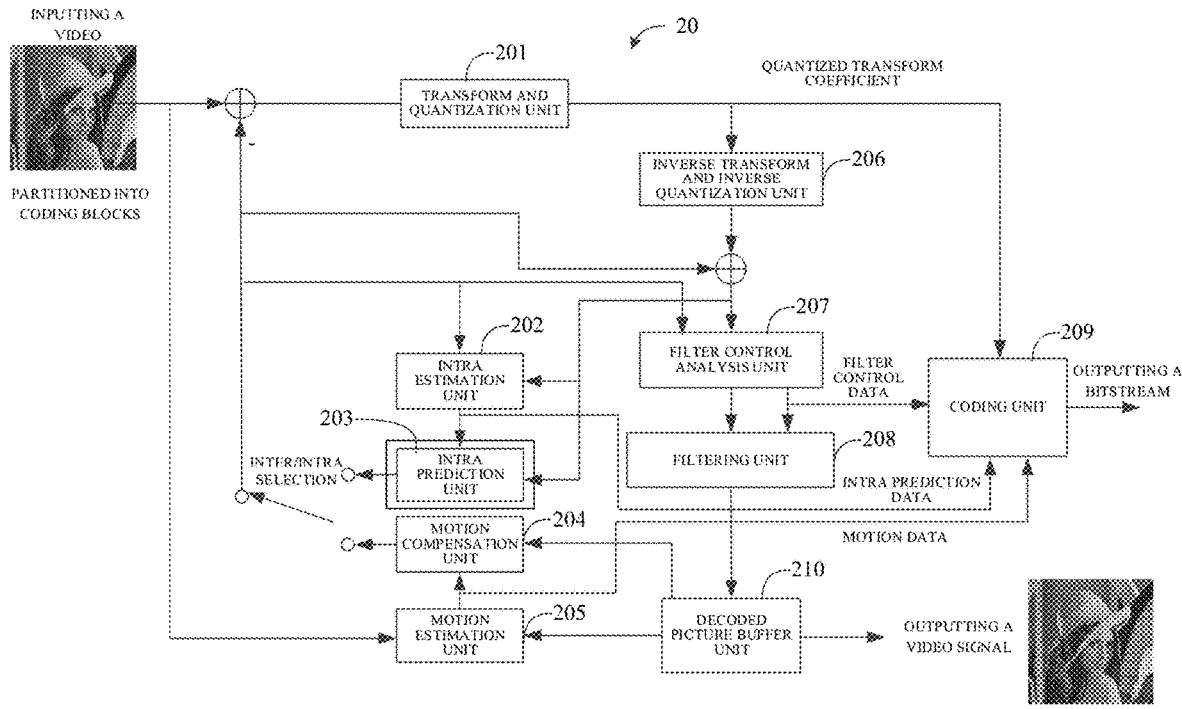
FIG. 2 is a schematic structural diagram of a video encoding system according to implementations.

FIG. 2 is a schematic structural diagram of a video encoding system according to implementations. As illustrated in FIG. 2, the video encoding system 20 includes a transform and quantization unit 201, an intra estimation unit 202, an intra prediction unit 203, a motion compensation unit 204, a motion estimation unit 205, an inverse transform and inverse quantization unit 206, a filter control analysis unit 207, a filtering unit 208, a coding unit 209, and a decoded picture buffer unit 210, etc. The filtering unit 208 can implement deblocking filtering and sample adaptive offset (SAO) filtering, and the coding unit 209 can implement header information encoding and context-based adaptive binary arithmetic coding (CABAC). For an input original video signal, one coding block can be obtained through partition of a coding tree unit (CTU). Then, for the residual sample information obtained after intra prediction or inter prediction, the coding block is transformed by the transform and quantization unit 201, including transforming the residual information from the sample domain to the transform domain, and the obtained transform coefficients are quantized, to further reduce the bit rate. The intra estimation unit 202 and the intra prediction unit 203 are used to perform intra prediction on the coding block. In an example, the intra estimation unit 202 and the intra prediction unit 203 are used to determine an intra prediction mode to-be-used to encode the coding block. The motion compensation unit 204 and the motion estimation unit 205 are used to perform inter prediction on the received coding block relative to one or more blocks in one or more reference pictures, to provide temporal prediction information. The motion estimation performed by the motion estimation unit 205 is a process of generating a motion vector, where the motion vector can estimate motion of the coding block. The motion compensation unit 204 is used to perform motion compensation based on the motion vector determined by the motion estimation unit 205. After the intra prediction mode is determined, the intra prediction unit 203 is used to provide the selected intra prediction data to the coding unit 209 and the motion estimation unit 205 is used to send the calculated motion vector data to the coding unit 209. In addition, the inverse transform and inverse quantization unit 206 is used for reconstruction of the coding block. A residual block is reconstructed in the sample domain, and blockiness artifacts of the reconstructed residual block are removed through the filter control analysis unit 207 and the filtering unit 208, and then the reconstructed residual block is added to a prediction of the picture in the decoded picture buffer unit 210, to generate a reconstructed coding block. The coding unit 209 is used to encode various encoding parameters and quantized transform coefficients. In the CABAC-based encoding algorithm, the context can be based on neighbouring coding blocks, and the coding unit 209 can be used to encode information indicating the determined intra prediction mode and output the bitstream of the video signal. The decoded picture buffer unit 210 is used to store reconstructed coding blocks, for prediction reference. As the picture encoding progresses, reconstructed coding blocks will be continuously generated, and these reconstructed coding blocks will be stored into the decoded picture buffer unit 210.

Figure 3:
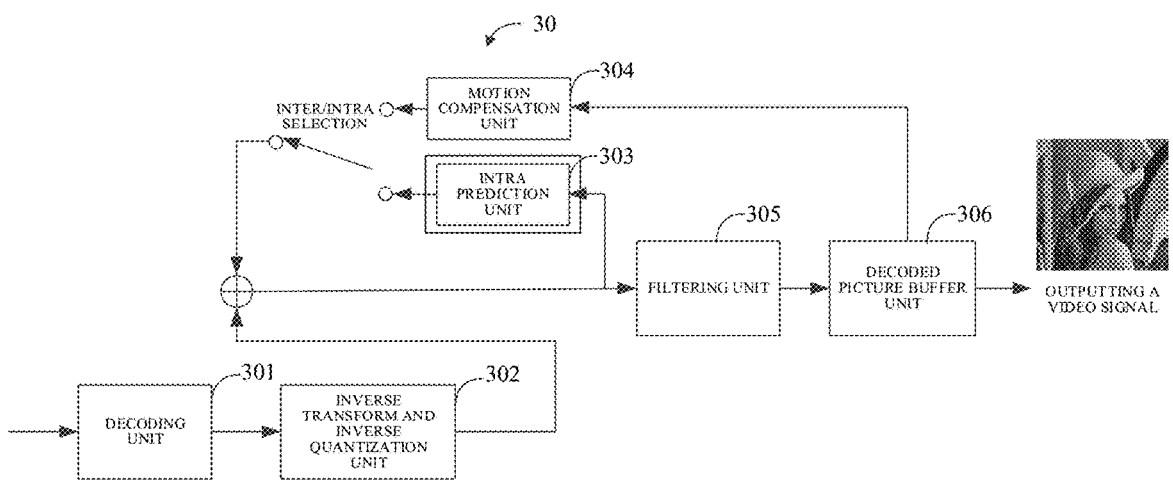
FIG. 3 is a schematic structural diagram of a video decoding system according to implementations.

FIG. 3 is a schematic structural diagram of a video decoding system according to implementations. As illustrated in FIG. 3, the video decoding system 30 includes a decoding unit 301, an inverse transform and inverse quantization unit 302, an intra prediction unit 303, a motion compensation unit 304, a filtering unit 305, a decoded picture buffer unit 306, and the like. The decoding unit 301 can implement header information decoding and CABAC, and the filtering unit 305 can implement deblocking filtering and SAO filtering. After the input video signal is encoded (as illustrated in FIG. 3), the bitstream of the video signal is output. The bitstream is input into the video decoding system 30. First, decoded transform coefficients are obtained through the decoding unit 301. The decoded transform coefficients are processed by the inverse transform and inverse quantization unit 302, so as to generate a residual block in the sample domain. The intra prediction unit 303 may be used to generate prediction data of the current coding block to-be-decoded based on the determined intra prediction mode and data from the previous decoded block of the current frame or picture. The motion compensation unit 304 is used to determine prediction information for the coding block to-be-decoded by analyzing motion vectors and other associated syntax elements, and use the prediction information to generate a prediction of the coding block that is being decoded. The decoded block is formed by summing the residual block from the inverse transform and inverse quantization unit 302 and the corresponding prediction generated by the intra prediction unit 303 or the motion compensation unit 304. The blockiness artifacts of the decoded block are removed through the filtering unit 305, which can improve quality of the video. The decoded block is then stored into the decoded picture buffer unit 306. The decoded picture buffer unit 306 is used to store reference pictures used for subsequent intra prediction or motion compensation, and is also used to output the video signal, that is, the restored original video signal is obtained.

The implementations can be applied to the intra prediction unit 203 illustrated in FIG. 2 and the intra prediction unit 303 illustrated in FIG. 3. That is, the implementations can be applied to a video encoding system and can also be applied to a video decoding system, which is not limited herein.

Figure 4:
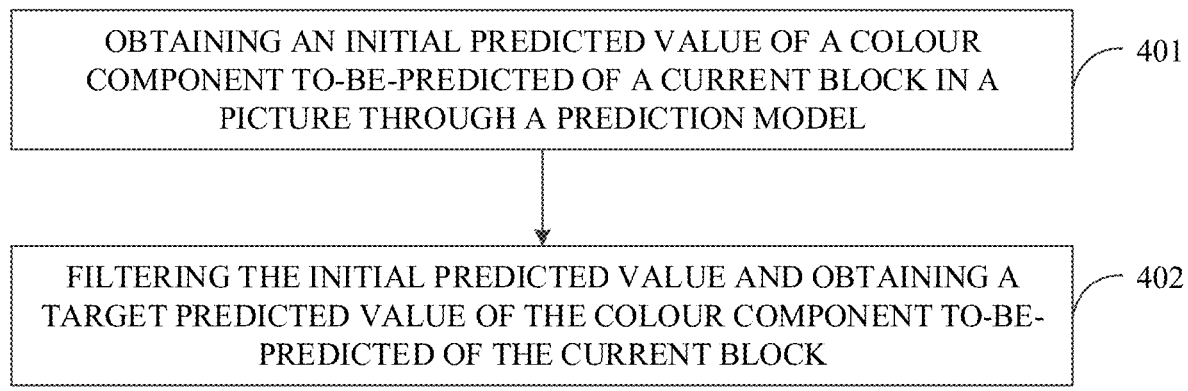
FIG. 4 is a schematic flowchart of a method for picture prediction according to implementations.

Based on the above application scenarios in FIG. 2 or FIG. 3, FIG. 4 is a schematic flowchart of a method for picture prediction according to implementations. The method includes the following.

At 401, an initial predicted value of a colour component to-be-predicted of a current block in a picture is obtained through a prediction model.

At 402, the initial predicted value is filtered and a target predicted value of the colour component to-be-predicted of the current block is obtained.

It is noted that, the picture of the video can be partitioned into multiple picture blocks, and each picture block currently to be encoded can be called a coding block. Each coding block may include a first colour component, a second colour component, and a third colour component. The current block is a coding block in the picture for which prediction of the first colour component, the second colour component, or the third colour component is currently to be performed.

It is also noted that, the method for picture prediction of the implementation can be applied to a video encoding system or a video decoding system, or even can be applied to both the video encoding system and the video decoding system, which is not limited herein.

According to the implementation, the initial predicted value of the colour component to-be-predicted of the current block in the picture is obtained through the prediction model. The initial predicted value is filtered and the target predicted value of the colour component to-be-predicted of the current block is obtained. In this way, after cross-component prediction is performed on the at least one colour component, the least one colour component is filtered, to balance the statistical characteristics of various colour components after cross-component prediction, thereby improving the prediction efficiency as well as the coding efficiency in video coding.

Furthermore, different colour components have different statistical characteristics, i.e., there is a difference in the statistical characteristics of various colour components. For example, the luma component has rich texture characteristics while the chroma component tends to be more uniform and flat. To balance the statistical characteristics of various colour components after cross-component prediction, there is a need to perform characteristic statistics on at least one colour component of the current block. In some implementations, for 402, before filtering the initial predicted value, the following is further performed.

Characteristic statistics is performed on at least one colour component of the current block, where the at least one colour component includes the colour component to-be-predicted, or a colour component to-be-referenced, or the colour component to-be-predicted and the colour component to-be-referenced, and the colour component to-be-predicted is different from the colour component to-be-referenced.

A reference value of the colour component to-be-predicted of the current block, or a reference value of the colour component to-be-referenced of the current block, or the reference value of the colour component to-be-predicted of the current block and the reference value of the colour component to-be-referenced of the current block is obtained according to a result of characteristic statistics, where the colour component to-be-predicted is a component that is predicted when the prediction model is constructed, and the colour component to-be-referenced is a component used for prediction when the prediction model is constructed.

It is noted that, the at least one colour component of the current block can be the colour component to-be-predicted, or the colour component to-be-referenced, or even the colour component to-be-predicted and the colour component to-be-referenced. If the prediction model is used to achieve prediction from the first colour component to the second colour component, the colour component to-be-predicted is the second colour component and the colour component to-be-referenced is the first colour component. If the prediction model is used to achieve prediction from the first colour component to the third colour component, the colour component to-be-predicted is the third colour component and the colour component to-be-referenced is still the first colour component.

In this way, through performing characteristic statistics on the at least one colour component of the current block, the reference value of the colour component to-be-predicted of the current block and/or the reference value of the colour component to-be-referenced of the current block can be obtained according to the result of characteristic statistics.

Furthermore, to improve the prediction efficiency, according to the reference value of the colour component to-be-predicted of the current block and/or the reference value of the colour component to-be-referenced of the current block, the initial predicted value of the colour component to-be-predicted of the current block can be filtered.

In some implementations, the initial predicted value is filtered and the target predicted value of the colour component to-be-predicted of the current block is obtained as follows.

The initial predicted value is filtered by using a preset processing mode, according to the reference value of the colour component to-be-predicted of the current block and/or the reference value of the colour component to-be-referenced of the current block, where the preset processing mode includes at least one of: filtering (or selecting), grouping, value modification, quantization, or de-quantization.

The target predicted value is obtained according to a result of the filtering.

It is noted that, according to the result of characteristic statistics of the at least one colour component of the current block, after the reference value of the colour component to-be-predicted of the current block and/or the reference value of the colour component to-be-referenced of the current block is obtained, the initial predicted value can be filtered by using the preset processing mode. For example, the initial predicted value can be filtered by using simple filtering. For another example, the initial predicted value can be filtered by using grouping. For yet another example, the initial predicted value can be filtered by using value modification. For still another example, the initial predicted value can be filtered by using quantization. For still another example, the initial predicted value can be filtered by using de-quantization (also called inverse quantization).

For example, to improve the prediction efficiency, i.e., improve accuracy of the predicted value(s), if the luma component is used to predict the chroma component, for the initial predicted value of the chroma component predicted by the prediction model, the following are described. If the preset processing mode is value modification, since the luma component and the chroma component have different statistical characteristics, a deviation factor can be obtained according to the difference in the statistical characteristics of the two colour components (i.e., the luma component and the chroma component). Then, the deviation factor is used to perform value modification on the initial predicted value, for example, the deviation factor is added to the initial predicted value, to balance the statistical characteristics of the two colour components after cross-component prediction. As such, the target predicted value of the chroma component is obtained. In this case, the target predicted value of the chroma component is closer to the true value of the chroma component. If the preset processing mode is filtering, since the luma component and the chroma component have different statistical characteristics, according to the difference in the statistical characteristics of the two colour components, the initial predicted value is filtered, to balance the statistical characteristics of the two colour components after cross-component prediction. As such, the target predicted value of the chroma component is obtained. In this case, the target predicted value of the chroma component is closer to the true value of the chroma component. If the preset processing mode is grouping, since the luma component and the chroma component have different statistical characteristics, according to the difference in the statistical characteristics of the two colour components, the initial predicted value is grouped, to balance the statistical characteristics of the two colour components after cross-component prediction. As such, the target predicted value of the chroma component is obtained according to the grouped initial predicted value. In this case, the target predicted value of the chroma component is closer to the true value of the chroma component. Furthermore, quantization and de-quantization on the luma component and the chroma component are involved in the process of determining the initial predicted value, and the luma component and the chroma component have different statistical characteristics. Due to the difference in the statistical characteristics of the two colour components, there may be differences between quantization and de-quantization. If the preset processing mode is quantization, the initial predicted value can be quantized to balance the statistical characteristics of the two colour components after cross-component prediction. As such, the target predicted value of the chroma component is obtained. In this case, the target predicted value of the chroma component is closer to the true value of the chroma component. If the preset processing mode is de-quantization, the initial predicted value can be de-quantized to balance the statistical characteristics of the two colour components after cross-component prediction. As such, the target predicted value of the chroma component is obtained. In this case, the target predicted value of the chroma component is closer to the true value of the chroma component. Therefore, the accuracy of the predicted value can be improved, and thus the prediction efficiency can be improved.

Furthermore, to improve the prediction efficiency, according to the reference value of the colour component to-be-predicted of the current block and/or the reference value of the colour component to-be-referenced of the current block, an initial predicted residual of the colour component to-be-predicted of the current block can be filtered.

In some implementations, for 401, after obtaining the initial predicted value of the colour component to-be-predicted of the current block in the picture through the prediction model, the following is further performed.

The initial predicted residual of the colour component to-be-predicted of the current block is obtained based on the initial predicted value.

The initial predicted residual is filtered by using a preset processing mode, according to the reference value of the colour component to-be-predicted of the current block, or the reference value of the colour component to-be-referenced of the current block, or the reference value of the colour component to-be-predicted of the current block and the reference value of the colour component to-be-referenced of the current block, where the preset processing mode includes at least one of: filtering, grouping, value modification, quantization, or de-quantization.

A target predicted residual is obtained according to a result of the filtering.

In some implementations, for 402, the target predicted value of the colour component to-be-predicted of the current block is obtained as follows.

The target predicted value of the colour component to-be-predicted of the current block is obtained according to the target predicted residual.

It is noted that, the predicted residual is a difference between the predicted value of the colour component and the true value of the colour component. To improve the coding efficiency in video coding, the predicted residual of the current block needs to be as small as possible.

To make the predicted residual as small as possible, on the one hand, after the initial predicted value of the colour component to-be-predicted is obtained through the prediction model, the initial predicted value is filtered by using the preset processing mode, to obtain the target predicted value of the colour component to-be-predicted. Since the target predicted value of the colour component to-be-predicted is close enough to the true value of the colour component to-be-predicted, the predicted residual between the target predicted value and the true value is very small. On the other hand, after the initial predicted value of the colour component to-be-predicted is obtained through the prediction model, the initial predicted residual of the colour component to-be-predicted is determined according to the difference between the initial predicted value of the colour component to-be-predicted and the true value of the colour component to-be-predicted. Thereafter, the initial predicted residual is filtered by using the preset processing mode, to obtain the target predicted residual of the colour component to-be-predicted. According to the target predicted residual, the target predicted value of the colour component to-be-predicted can be obtained. Since the target predicted residual is as small as possible, the target predicted value of the colour component to-be-predicted is as close as possible to the true value of the colour component to-be-predicted. That is, according to the implementation, it is possible to not only filter the initial predicted value of the colour component to-be-predicted of the current block, but also filter the initial predicted residual of the colour component to-be-predicted of the current block. After filtering, the statistical characteristics of the two colour components after cross-component prediction can be balanced. As such, the prediction efficiency can be improved. Moreover, since the target predicted value is closer to the true value, the target predicted residual of the colour component to-be-predicted is smaller, so that less bit rate can be transmitted during coding and the coding efficiency in video coding can also be improved.

Furthermore, before obtaining the initial predicted value of the colour component to-be-predicted of the current block, a model parameter of the prediction model needs to be obtained, to construct the prediction model. In some implementations, for 401, before obtaining the initial predicted value of the colour component to-be-predicted of the current block in the picture through the prediction model, the following is further performed.

A reference value of the colour component to-be-predicted of the current block is determined, where the reference value of the colour component to-be-predicted of the current block is a colour component to-be-predicted value of a neighbouring sample of the current block.

A reference value of the colour component to-be-referenced of the current block is determined, where the colour component to-be-referenced of the current block is different from the colour component to-be-predicted and the reference value of the colour component to-be-referenced of the current block is a colour component to-be-referenced value of a neighbouring sample of the current block.

The model parameter of the prediction model is obtained according to the reference value of the colour component to-be-predicted of the current block and the reference value of the colour component to-be-referenced of the current block.

The prediction model is constructed according to the obtained model parameter, where the prediction model is used to perform cross-component prediction on the colour component to-be-predicted of the current block according to the colour component to-be-referenced of the current block.

In the implementation, the prediction model can be a linear model, for example, a cross-component prediction technique such as CCLM prediction; the prediction model can also be a non-linear model, for example, a cross-component prediction technique such as a multiple model CCLM (MMLM) prediction, which includes multiple linear models. The following describes an example where the prediction model is a linear model, but the method for picture prediction of the implementation can also be applied to a non-linear model.

The model parameter includes a first model parameter (represented by $\alpha$) and a second model parameter (represented by $\beta$). $\alpha$ and $\beta$ can be calculated in a variety of ways, for example, using a preset factor calculation model constructed with a least square method, or a preset factor calculation model constructed with the maximum value and the minimum value, or even a preset factor calculation model constructed with other means. The disclosure is not limited thereto.

For example, the preset factor calculation model constructed with the least square method is used. First, the reference value of the colour component to-be-predicted of the current block and the reference value of the colour component to-be-referenced of the current block are determined. The reference value of the colour component to-be-referenced of the current block is a colour component to-be-referenced value of a neighbouring sample of the current block (for example, a neighbouring reference value of the first colour component) and the reference value of the colour component to-be-predicted of the current block is a colour component to-be-predicted value of a neighbouring sample of the current block (for example, a neighbouring reference value of the second colour component). The model parameters can be derived by minimizing the regression error of the neighbouring reference value of the first colour component and the neighbouring reference value of the second colour component. As illustrated in the equation (1):

$$\begin{cases} \alpha = \dfrac{2N \cdot \sum (L(n) \cdot C(n)) - \sum L(n) \cdot \sum C(n)}{2N \cdot \sum (L(n) \cdot L(n)) - \sum L(n) \cdot \sum L(n)} \\ \beta = \dfrac{\sum C(n) - \alpha \cdot \sum L(n)}{2N} \end{cases} \quad (1)$$

where L(n) denotes neighbouring reference values of the down-sampled first colour component corresponding to the left side and the upper side of the current block, C(n) denotes neighbouring reference values of the second colour component corresponding to the left side and the upper side of the current block, N denotes the side length of the second colour component of the current block, and n=1, 2, . . . , 2N. The first model parameter $\alpha$ and the second model parameter $\beta$ can be obtained through the equation (1). Based on $\alpha$ and $\beta$, assuming that the first colour component is used to predict the second colour component, the constructed prediction model is illustrated in the equation (2), $$\text{Pred}_C[i,j] = \alpha \cdot \text{Rec}_L[i,j] + \beta \quad (2)$$

where i, j represents a position coordinate of a sample in the current block, i represents the horizontal direction, j represents the vertical direction, $\text{Pred}_c[i, j]$ represents a predicted value of the second colour component corresponding to a sample having a position coordinate of [i, j] in the current block, and $\text{Rec}_L[i, j]$ represents a reconstructed value of the first colour component corresponding to the sample having the position coordinate of [i, j] in the same current block (after down-sampling).

For another example, the preset factor calculation model constructed with the maximum value and the minimum value is used, which provides a simplified derivation method of model parameters. The model parameters can be derived according to the principle that two points determine one line by searching for the maximum value and the minimum value from the neighbouring reference values of the first colour component, as illustrated in the equation (3):

$$\begin{cases} \alpha = \dfrac{L_{max} - L_{min}}{C_{max} - C_{min}} \\ \beta = L_{min} - \alpha \cdot C_{min} \end{cases} \quad (3)$$

where $L_{max}$ and $L_{min}$ respectively denote the maximum value and the minimum value searched from the neighbouring reference values of the down-sampled first colour component corresponding to the left side and the upper side of the current block, $C_{max}$ denotes a neighbouring reference value of the second colour component corresponding to a reference sample at a position corresponding to $L_{max}$, and $C_{min}$ denotes a neighbouring reference value of the second colour component corresponding to a reference sample at a position corresponding to $L_{min}$. The first model parameter $\alpha$ and the second model parameter $\beta$ can also be obtained through $L_{max}$ and $L_{min}$ as well as $C_{max}$ and $C_{min}$ and the equation (3). Based on $\alpha$ and $\beta$, assuming that the first colour component is used to predict the second colour component, the constructed prediction model is also illustrated in the equation (2).

After the prediction model is constructed, the colour component prediction can be performed according to the prediction model, for example, the prediction model illustrated in the equation (2). In an example, it is possible to use the first colour component to predict the second colour component, such as using the luma component to predict the chroma component, to obtain the initial predicted value of the chroma component. Thereafter, the initial predicted value of the chroma component can be filtered by using the preset processing mode according to the reference value of the luma component and/or the reference value of the chroma component, to obtain the target predicted value of the chroma component. In another example, it is possible to use the second colour component to predict the first colour component, such as using the chroma component to predict the luma component, to obtain the initial predicted value of the luma component. Thereafter, the initial predicted value of the luma component can be filtered by using the preset processing mode according to the reference value of the luma component and/or the reference value of the chroma component, to obtain the target predicted value of the luma component. In still another example, it is possible to use the second colour component to predict the third colour component, such as using a blue chroma component to predict a red chroma component, to obtain the initial predicted value of the red chroma component. Thereafter, the initial predicted value of the red chroma component can be filtered by using the preset processing mode according to the reference value of the blue chroma component and/or the reference value of the red chroma component, to obtain the target predicted value of the red chroma component. This can improve the prediction efficiency.

Furthermore, since various colour components have different resolutions, to facilitate construction of the prediction model, it is also necessary to adjust the resolution of the colour component (e.g., up-sampling or down-sampling the colour component), to reach a target resolution of the colour component to-be-predicted.

In some implementations, before obtaining the model parameter of the prediction model, the following is further performed.

A resolution of the colour component to-be-referenced of the current block is adjusted when the resolution of the colour component to-be-referenced of the current block is different from a resolution of the colour component to-be-predicted of the current block, where the adjusting includes up-sampling or down-sampling.

The reference value of the colour component to-be-referenced of the current block is updated based on the adjusted resolution of the colour component to-be-referenced, to obtain a first reference value of the colour component to-be-referenced of the current block, where the adjusted resolution of the colour component to-be-referenced is the same as the resolution of the colour component to-be-predicted of the current block.

In some implementations, before obtaining the model parameter of the prediction model, the following is further performed.

The reference value of the colour component to-be-referenced of the current block is adjusted to obtain a first reference value of the colour component to-be-referenced of the current block, when a resolution of the colour component to-be-referenced of the current block is different from a resolution of the colour component to-be-predicted of the current block, where the adjusting includes one of: down-sampling filtering, up-sampling filtering, cascaded filtering of the down-sampling filtering and low-pass filtering, and cascaded filtering of the up-sampling filtering and the low-pass filtering.

It is noted that, when the resolution of the colour component to-be-referenced of the current block is different from the resolution of the colour component to-be-predicted of the current block, the resolution of the colour component to-be-referenced of the current block is adjusted, i.e., resolution adjustment is performed on the colour component to-be-referenced of the current block, such that the adjusted resolution of the colour component to-be-referenced is the same as the resolution of the colour component to-be-predicted of the current block. Herein, the resolution adjustment includes up-sampling or down-sampling. According to the adjusted resolution of the colour component to-be-referenced, the reference value of the colour component to-be-referenced of the current block is updated, to obtain the first reference value of the colour component to-be-referenced of the current block.

Furthermore, if the resolution of the colour component to-be-referenced of the current block is different from the resolution of the colour component to-be-predicted of the current block, the reference value of the colour component to-be-referenced of the current block is adjusted, to obtain the first reference value of the colour component to-be-referenced of the current block. The adjusting includes one of: down-sampling filtering, up-sampling filtering, cascaded filtering of the down-sampling filtering and low-pass filtering, and cascaded filtering of the up-sampling filtering and the low-pass filtering.

In some implementations, the model parameter of the prediction model is obtained according to the reference value of the colour component to-be-predicted of the current block and the reference value of the colour component to-be-referenced of the current block as follows.

The model parameter of the prediction model is obtained according to the reference value of the colour component to-be-predicted of the current block and the first reference value of the colour component to-be-referenced of the current block.

It is noted that, if the resolution of the colour component to-be-referenced of the current block is different from the resolution of the colour component to-be-predicted of the current block, after the first reference value of the colour component to-be-referenced of the current block is obtained, the model parameter of the prediction model can be obtained according to the reference value of the colour component to-be-predicted of the current block and the first reference value of the colour component to-be-referenced of the current block.

Assuming that the luma component is used to predict the chroma component, in this case, the colour component to-be-referenced is the luma component and the colour component to-be-predicted is the chroma component. The resolution of the luma component and the chroma component are different. After the target resolution of the chroma component is obtained, since the resolution of the luma component does not match the target resolution, the resolution of the luma component needs to be adjusted. For example, down-sampling is performed on the luma component, to make the adjusted resolution of the luma component match the target resolution. If the chroma component is used to predict the luma component, after the target resolution of the luma component is obtained, since the resolution of the chroma component does not match the target resolution, the resolution of the chroma component needs to be adjusted. For example, up-sampling is performed on the chroma component, to make the adjusted resolution of the chroma component match the target resolution. If a blue chroma component is used to predict a red chroma component, after the target resolution of the red chroma component is obtained, since the resolution of the blue chroma component is the same as the resolution of the red chroma component, there is no need to adjust the resolution of the blue chroma component. The resolution of the blue chroma component has already met the target resolution. In this way, the first reference value of the colour component to-be-referenced of the current block can be obtained at a resolution which is the same as that used for the colour component to-be-predicted, and the prediction model can be constructed for colour component prediction.

Furthermore, to improve the prediction efficiency, the initial predicted value of the colour component to-be-predicted of the current block can be filtered according to a reference value of the colour component to-be-predicted of the current block.

In some implementations, for 402, the initial predicted value is filtered as follows.

The initial predicted value is filtered according to the reference value of the colour component to-be-predicted of the current block and the target predicted value is obtained, where the reference value of the colour component to-be-predicted of the current block is obtained by performing characteristic statistics on the colour component to-be-predicted of the picture or the colour component to-be-predicted of the current block.

In some implementations, the initial predicted value is filtered according to the reference value of the colour component to-be-predicted of the current block as follows.

The initial predicted value is filtered by using a preset processing mode according to the reference value of the colour component to-be-predicted of the current block, where the preset processing mode includes at least one of: filtering, grouping, value modification, quantization, inverse quantization, low-pass filtering, or adaptive filtering.

In some implementations, for 402, the initial predicted value is filtered according to the reference value of the colour component to-be-predicted of the current block as follows.

An initial predicted residual of the colour component to-be-predicted of the current block is obtained based on the initial predicted value.

The initial predicted residual is filtered by using a preset processing mode according to the reference value of the colour component to-be-predicted of the current block, where the preset processing mode includes at least one of: filtering, grouping, value modification, quantization, inverse quantization, low-pass filtering, or adaptive filtering.

It is noted that, the preset processing mode can be filtering, grouping, value modification, quantization, inverse quantization, low-pass filtering, adaptive filtering, or the like. Furthermore, the reference value of the colour component to-be-predicted of the current block is obtained by performing characteristic statistics on the colour component to-be-predicted of the picture or the colour component to-be-predicted of the current block. Herein, characteristic statistics is not limited to the colour component to-be-predicted of the current block, in contrast, the characteristic statistics can be performed on the colour component to-be-predicted of the picture to which the current block belongs.

For the process of filtering, after the initial predicted value of the colour component to-be-predicted of the current block is obtained, the initial predicted value can be filtered with the preset processing mode according to the reference value of the colour component to-be-predicted of the current block, so as to obtain the target predicted value. Alternatively, the initial predicted residual of the colour component to-be-predicted of the current block is obtained according to the initial predicted value. Then, the initial predicted residual is filtered with the preset processing mode according to the reference value of the colour component to-be-predicted of the current block, to obtain the target predicted residual. According to the target predicted residual, the target predicted value can be obtained.

Furthermore, to improve the prediction efficiency, according to the reference value of the colour component to-be-predicted of the current block and the reference value of the colour component to-be-referenced of the current block, the initial predicted value of the colour component to-be-predicted of the current block can be filtered.

In some implementations, for 401, before obtaining the initial predicted value of the colour component to-be-predicted of the current block in the picture through the prediction model, the following is further performed.

Characteristic statistics is performed on the colour component to-be-predicted of the picture.

A reference value of the colour component to-be-predicted of the current block and a reference value of the colour component to-be-referenced of the current block are determined according to a result of characteristic statistics, where the colour component to-be-referenced is different from the colour component to-be-predicted.

A model parameter of the prediction model is obtained according to the reference value of the colour component to-be-predicted of the current block and the reference value of the colour component to-be-referenced of the current block.

In some implementations, the following is further performed.

The initial predicted value is filtered by using a preset processing mode, according to the reference value of the colour component to-be-predicted of the current block and the reference value of the colour component to-be-referenced of the current block, where the preset processing mode includes at least one of: filtering, grouping, value modification, quantization, inverse quantization, low-pass filtering, or adaptive filtering.

It is noted that, different colour components have different statistical characteristics, i.e., there is a difference in the statistical characteristics of various colour components. For example, the luma component has rich texture characteristics while the chroma component tends to be more uniform and flat. To balance the statistical characteristics of various colour components after cross-component prediction, there is a need to perform characteristic statistics on the at least one colour component of the current block. For example, characteristic statistics is performed on the colour component to-be-predicted of the picture. The reference value of the colour component to-be-predicted of the current block and the reference value of the colour component to-be-referenced of the current block are determined according to the result of characteristic statistics. According to the reference value of the colour component to-be-predicted of the current block and the reference value of the colour component to-be-referenced of the current block, it is possible to not only obtain the model parameter of the prediction model to construct the prediction model, but also filter the initial predicted value. As such, the statistical characteristics of various colour components after cross-component prediction can be balanced, thereby improving the prediction efficiency.

Figure 5:
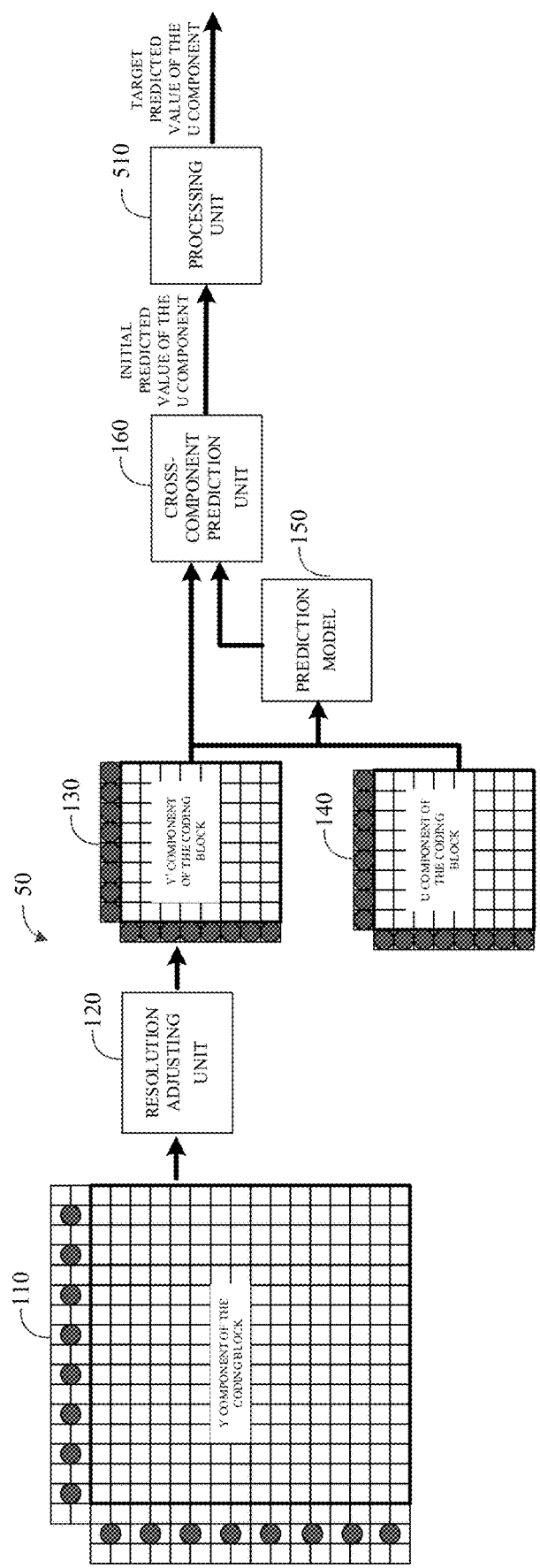
FIG. 5 is a schematic structural diagram of an improved architecture for cross-component prediction according to implementations.

FIG. 5 is a schematic structural diagram of an improved architecture for cross-component prediction according to implementations. As illustrated in FIG. 5, based on the related architecture 10 for cross-component prediction of FIG. 1, the improved architecture 50 for cross-component prediction further includes a processing unit 510. The processing unit 510 is configured to perform a related processing on an initial predicted value obtained through the cross-component prediction unit 160, to obtain a more accurate target predicted value.

In FIG. 5, for the current block, assuming that the Y component is used to predict the U component, since the Y component 110 of the coding block and the U component 140 of the coding block have different resolutions, the resolution adjusting unit 120 needs to adjust the resolution of the Y component, to obtain the $Y^1$ component 130 of the coding block having the same resolution as the U component 140 of the coding block. Then, by using the neighbouring reference values $Y^1(n)$ of the $Y^1$ component 130 of the coding block and the neighbouring reference values C(n) of the U component 140 of the coding block, the prediction model 150 can be constructed. According to reconstructed sample values of the $Y^1$ component 130 of the coding block and the prediction model 150, the colour component prediction is performed by the cross-component prediction unit 160, to obtain the initial predicted value of the U component. To improve prediction efficiency, the processing unit 510 can perform the related processing on the initial predicted value of the U component, for example, filtering, grouping, value modification, quantization, inverse quantization, or the like, to obtain a target predicted value of the U component. The target predicted value of the U component is closer to the true value of the U component, thereby improving the prediction efficiency as well as the coding efficiency in video coding.

Furthermore, in the implementation, in the case that the method for picture prediction is applied to an encoder, after the target predicted value is obtained, the predicted residual is determined according to the difference of the target predicted value and the true value and then the predicted residual is signaled in a bitstream. The model parameter of the prediction model can be obtained according to the reference value of the colour component to-be-predicted of the current block and the reference value of the colour component to-be-referenced of the current block. The obtained model parameter is signaled in the bitstream. The bitstream is transmitted from the encoder to a decoder. Accordingly, in the case that the method for picture prediction is applied to a decoder, by parsing the bitstream, the predicted residual is obtained. Furthermore, by parsing the bitstream, the model parameter of the prediction model is obtained, to construct the prediction model. In this way, in the decoder, through the prediction model, the initial predicted value of the colour component to-be-predicted of the current block is obtained, and the initial predicted value is filtered to obtain the target predicted value of the colour component to-be-predicted of the current block.

According to the method for picture prediction, the encoder, the decoder, and the storage medium, the initial predicted value of the colour component to-be-predicted of the current block in the picture is obtained through the prediction model. The initial predicted value is filtered and the target predicted value of the colour component to-be-predicted of the current block is obtained. In this way, after cross-component prediction is performed on the at least one colour component of the current block, the least one colour component is filtered, to balance the statistical characteristics of various colour components after cross-component prediction, thereby improving the prediction efficiency. Furthermore, since the target predicted value is closer to the true value, the target predicted residual of the colour component is smaller. In this way, less bit rate can be transmitted during coding and the coding efficiency in video coding can also be improved.

Figure 6:
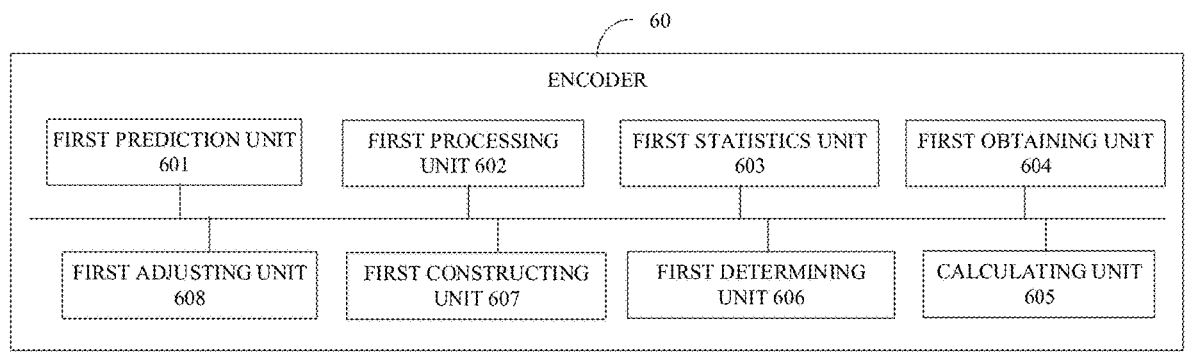
FIG. 6 is a schematic structural diagram of an encoder according to implementations.

FIG. 6 is a schematic structural diagram of an encoder 60 according to implementations. The encoder 60 includes a first prediction unit 601 and a first processing unit 602.

The first prediction unit 601 is configured to obtain an initial predicted value of a colour component to-be-predicted of a current block in a picture through a prediction model.

The first processing unit 602 is configured to filter the initial predicted value and obtain a target predicted value of the colour component to-be-predicted of the current block.

In the above solution, referring to FIG. 6, the encoder 60 further includes a first statistics unit 603 and a first obtaining unit 604.

The first statistics unit 603 is configured to perform characteristic statistics on at least one colour component of the current block, where the at least one colour component includes the colour component to-be-predicted, or a colour component to-be-referenced, or the colour component to-be-predicted and the colour component to-be-referenced, and the colour component to-be-predicted is different from the colour component to-be-referenced.

The first obtaining unit 604 is configured to obtain, according to a result of characteristic statistics, a reference value of the colour component to-be-predicted of the current block, or a reference value of the colour component to-be-referenced of the current block, or the reference value of the colour component to-be-predicted of the current block and the reference value of the colour component to-be-referenced of the current block, where the colour component to-be-predicted is a component that is predicted when the prediction model is constructed, and the colour component to-be-referenced is a component used for prediction when the prediction model is constructed.

In the above solution, the first processing unit 602 is configured to filter the initial predicted value by using a preset processing mode, according to the reference value of the colour component to-be-predicted of the current block, or the reference value of the colour component to-be-referenced of the current block, or the reference value of the colour component to-be-predicted of the current block and the reference value of the colour component to-be-referenced of the current block, where the preset processing mode includes at least one of: filtering, grouping, value modification, quantization, or de-quantization.

The first obtaining unit 604 is configured to obtain the target predicted value according to a result of the filtering.

In the above solution, referring to FIG. 6, the encoder 60 further includes a calculating unit 605. The calculating unit 605 is configured to obtain an initial predicted residual of the colour component to-be-predicted of the current block based on the initial predicted value.

The first processing unit 602 is further configured to filter the initial predicted residual by using a preset processing mode, according to the reference value of the colour component to-be-predicted of the current block, or the reference value of the colour component to-be-referenced of the current block, or the reference value of the colour component to-be-predicted of the current block and the reference value of the colour component to-be-referenced of the current block, where the preset processing mode includes at least one of: filtering, grouping, value modification, quantization, or de-quantization.

The first obtaining unit 604 is further configured to obtain a target predicted residual according to a result of the filtering.

In the above solution, the calculating unit 605 is further configured to obtain the target predicted value of the colour component to-be-predicted of the current block according to the target predicted residual.

In the above solution, referring to FIG. 6, the encoder 60 further includes a first determining unit 606 and a first constructing unit 607.

The first determining unit 606 is configured to determine a reference value of the colour component to-be-predicted of the current block, where the reference value of the colour component to-be-predicted of the current block is a colour component to-be-predicted value of a neighbouring sample of the current block; determine a reference value of the colour component to-be-referenced of the current block, where the colour component to-be-referenced of the current block is different from the colour component to-be-predicted and the reference value of the colour component to-be-referenced of the current block is a colour component to-be-referenced value of a neighbouring sample of the current block.

The calculating unit 605 is further configured to obtain a model parameter of the prediction model according to the reference value of the colour component to-be-predicted of the current block and the reference value of the colour component to-be-referenced of the current block.

The first constructing unit 607 is configured to construct the prediction model according to the obtained model parameter, where the prediction model is used to perform cross-component prediction on the colour component to-be-predicted of the current block according to the colour component to-be-referenced of the current block.

In the above solution, referring to FIG. 6, the encoder 60 further includes a first adjusting unit 608. The first adjusting unit 608 is configured to adjust a resolution of the colour component to-be-referenced of the current block when the resolution of the colour component to-be-referenced of the current block is different from a resolution of the colour component to-be-predicted of the current block, where the adjusting includes up-sampling or down-sampling; and update, based on the adjusted resolution of the colour component to-be-referenced, the reference value of the colour component to-be-referenced of the current block to obtain a first reference value of the colour component to-be-referenced of the current block, where the adjusted resolution of the colour component to-be-referenced is the same as the resolution of the colour component to-be-predicted of the current block.

In the above solution, the first adjusting unit 608 is further configured to adjust the reference value of the colour component to-be-referenced of the current block to obtain a first reference value of the colour component to-be-referenced of the current block, when a resolution of the colour component to-be-referenced of the current block is different from a resolution of the colour component to-be-predicted of the current block, where the adjusting includes one of: down-sampling filtering, up-sampling filtering, cascaded filtering of the down-sampling filtering and low-pass filtering, and cascaded filtering of the up-sampling filtering and the low-pass filtering.

In the above solution, the calculating unit 605 is further configured to obtain the model parameter of the prediction model according to the reference value of the colour component to-be-predicted of the current block and the first reference value of the colour component to-be-referenced of the current block.

In the above solution, the first processing unit 602 is further configured to filter the initial predicted value according to a reference value of the colour component to-be-predicted of the current block and obtain the target predicted value, where the reference value of the colour component to-be-predicted of the current block is obtained by performing characteristic statistics on the colour component to-be-predicted of the picture or the colour component to-be-predicted of the current block.

In the above solution, the first processing unit 602 is further configured to filter the initial predicted value by using a preset processing mode according to the reference value of the colour component to-be-predicted of the current block, where the preset processing mode includes at least one of: filtering, grouping, value modification, quantization, inverse quantization, low-pass filtering, or adaptive filtering.

In the above solution, the calculating unit 605 is further configured to obtain an initial predicted residual of the colour component to-be-predicted of the current block based on the initial predicted value.

The first processing unit 602 is further configured to filter the initial predicted residual by using a preset processing mode according to the reference value of the colour component to-be-predicted of the current block, where the preset processing mode includes at least one of: filtering, grouping, value modification, quantization, inverse quantization, low-pass filtering, or adaptive filtering.

In the above solution, the first statistics unit 603 is further configured to perform characteristic statistics on the colour component to-be-predicted of the picture.

The first determining unit 606 is further configured to determine, according to a result of characteristic statistics, a reference value of the colour component to-be-predicted of the current block and a reference value of the colour component to-be-referenced of the current block, where the colour component to-be-referenced is different from the colour component to-be-predicted.

The calculating unit 605 is further configured to obtain a model parameter of the prediction model according to the reference value of the colour component to-be-predicted of the current block and the reference value of the colour component to-be-referenced of the current block.

In the above solution, the first processing unit 602 is further configured to filter the initial predicted value by using a preset processing mode, according to the reference value of the colour component to-be-predicted of the current block and the reference value of the colour component to-be-referenced of the current block, where the preset processing mode includes at least one of: filtering, grouping, value modification, quantization, inverse quantization, low-pass filtering, or adaptive filtering.

It can be understood that, in the implementation, a "unit" may be a part of a circuit, a part of a processor, a part of a program, or software, etc., which can be a module or not. In addition, in the implementation, the various components may be integrated into one processing unit, or each unit may be physically present, or two or more units may be integrated into one unit. The above-mentioned integrated unit can be implemented in the form of hardware or a software function unit.

The integrated unit may be stored in a computer readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and the like) to perform all or part of the steps described in the various implementations of the present disclosure. The memory includes various medium capable of storing program codes, such as a universal serial bus (USB) flash disk, a read-only memory (ROM), a random access memory (RAM), a removable hard disk, disk, compact disc (CD), or the like.

Implementations further provide a computer storage medium. The computer storage medium stores programs for picture prediction. When executed by at least one processor, the programs are configured to implement the operations of the method of the above implementations.

Figure 7:
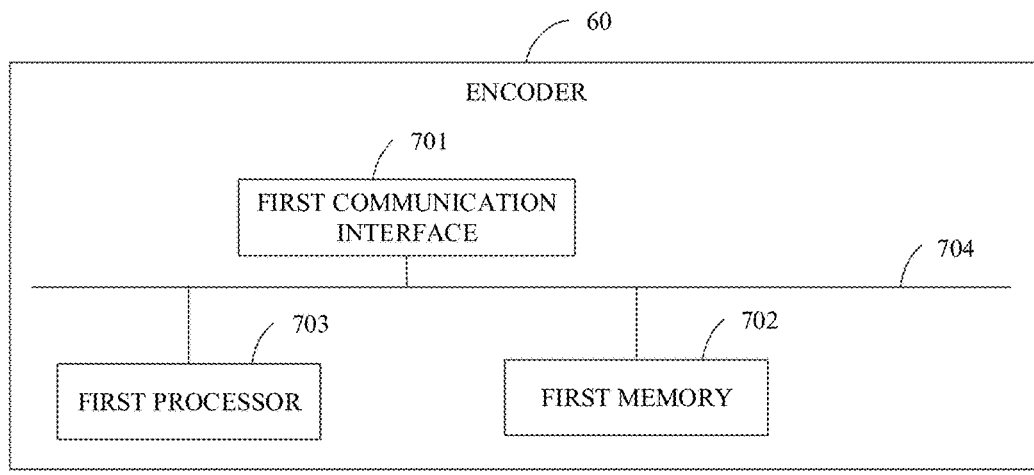
FIG. 7 is a schematic structural diagram of hardware of an encoder according to implementations.

Based on the structure of the encoder 60 and the computer storage medium, FIG. 7 is a schematic structural diagram of hardware of the encoder 60 according to implementations. The encoder 60 may include a first communication interface 701, a first memory 702, and a first processor 703, where various components are coupled together through a first bus system 704. It can be understood that, the first bus system 704 is used to implement connection and communication between these components. In addition to a data bus, the first bus system 704 also includes a power bus, a control bus, and a status signal bus. However, for clarity of description, in FIG. 7, various buses are marked as the first bus system 704.

The first communication interface 701 is used for receiving and sending signals in the process of sending/receiving information to/from other external network elements.

The first memory 702 is configured to store computer programs than can be run on the first processor 703.

The first processor 703 is configured to execute the following when running the computer programs.

An initial predicted value of a colour component to-be-predicted of a current block in a picture is obtained through a prediction model. The initial predicted value is filtered and a target predicted value of the colour component to-be-predicted of the current block is obtained.

It can be understood that, the first memory 702 in the implementation may be a volatile memory or a non-volatile memory, or may include both volatile and non-volatile memory. The non-volatile memory may be a ROM, a programmable read-only memory (PROM), an erasable programmable read-only memory (EPROM), an electrically erasable programmable read-only memory (EEPROM) or flash memory. The volatile memory may be a RAM, which is used as an external cache. By way of example, but not limitation, many forms of RAM are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct memory bus random access memory (DRRAM). It is noted that the first memory 702 of the systems and methods described herein is intended to include, but is not limited to, these and any other suitable types of memory.

The first processor 703 in the implementation of this application may be an integrated circuit chip and has a signal processing capability. In the implementation process, each step of the foregoing method implementation may be completed by using an integrated logic circuit of hardware in the first processor 703 or an instruction in a form of software. The above first processor 703 may be a general-purpose processor, a digital signal processor (DSP), an application specific integrated circuit (ASIC), a field programmable gate array (FPGA), or other programming logic devices, discrete gate or transistor logic devices, discrete hardware components. Various methods, steps, and logical block diagrams disclosed in the implementations of this application can be implemented or executed. The general-purpose processor may be a microprocessor or the processor may be any conventional processor or the like. The steps of the method disclosed in combination with the implementations of this application may be directly implemented by a hardware decoding processor, or may be performed by using a combination of hardware and software modules in the decoding processor. The software module may be located in a mature storage medium such as a random access memory, a flash memory, a read-only memory, a programmable read-only memory, or an electrically erasable programmable memory, a register, and the like. The storage medium is located in the first memory 702, and the first processor 703 reads the information in the first memory 702 and completes the steps of the foregoing method in combination with its hardware.

It can be understood that these implementations described in the disclosure may be implemented by hardware, software, firmware, middleware, a microcode or a combination thereof. In case of implementation with the hardware, the processing unit may be implemented in one or more ASICs, DSPs, DSP devices (DSPDs), PLDs, FPGAs, universal processors, controllers, microcontrollers, microprocessors, other electronic units configured to execute the functions in the disclosure or combinations thereof. In case of implementation with the software, the technology of the disclosure may be implemented through the modules (for example, processes and functions) executing the functions in the disclosure. A software code may be stored in the memory and executed by the processor. The memory may be implemented inside the processor or outside the processor.

In another implementation, the first processor 703 is further configured to execute the method described in any of the foregoing implementations when running the computer programs.

According to the implementation, the encoder is provided and the encoder includes the first prediction unit and the first processing unit. The first prediction unit is configured to obtain an initial predicted value of a colour component to-be-predicted of a current block in a picture through a prediction model. The first processing unit is configured to filter the initial predicted value and obtain a target predicted value of the colour component to-be-predicted of the current block. In this way, after cross-component prediction is performed on the at least one colour component of the current block, the least one colour component is filtered, to balance the statistical characteristics of various colour components after cross-component prediction, thereby improving the prediction efficiency. Furthermore, since the target predicted value is closer to the true value, the target predicted residual of the colour component is smaller. In this way, less bit rate can be transmitted during coding and the coding efficiency in video coding can also be improved.

Figure 8:
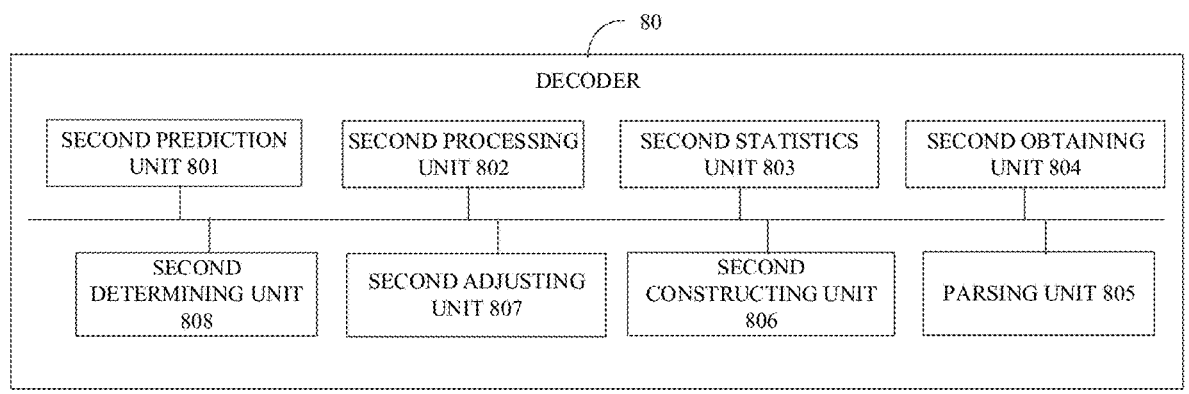
FIG. 8 is a schematic structural diagram of a decoder according to implementations.

Based on the similar inventive concept as the foregoing implementation, FIG. 8 is a schematic structural diagram of a decoder 80 according to implementations. The decoder 80 includes a second prediction unit 801 and a second processing unit 802.

The second prediction unit 801 is configured to obtain an initial predicted value of a colour component to-be-predicted of a current block in a picture through a prediction model.

The second processing unit 802 is configured to filter the initial predicted value and obtain a target predicted value of the colour component to-be-predicted of the current block.

In the above solution, referring to FIG. 8, the decoder 80 further includes a second statistics unit 803 and a second obtaining unit 804.

The second statistics unit 803 is configured to perform characteristic statistics on at least one colour component of the current block, where the at least one colour component includes the colour component to-be-predicted, or a colour component to-be-referenced, or the colour component to-be-predicted and the colour component to-be-referenced, and the colour component to-be-predicted is different from the colour component to-be-referenced.

The second obtaining unit 804 is configured to obtain, according to a result of characteristic statistics, a reference value of the colour component to-be-predicted of the current block, or a reference value of the colour component to-be-referenced of the current block, or the reference value of the colour component to-be-predicted of the current block and the reference value of the colour component to-be-referenced of the current block, where the colour component to-be-predicted is a component that is predicted when the prediction model is constructed, and the colour component to-be-referenced is a component used for prediction when the prediction model is constructed.

In the above solution, the second processing unit 802 is configured to filter the initial predicted value by using a preset processing mode, according to the reference value of the colour component to-be-predicted of the current block, or the reference value of the colour component to-be-referenced of the current block, or the reference value of the colour component to-be-predicted of the current block and the reference value of the colour component to-be-referenced of the current block, where the preset processing mode includes at least one of: filtering, grouping, value modification, quantization, or de-quantization.

The second obtaining unit 804 is configured to obtain the target predicted value according to a result of the filtering.

In the above solution, referring to FIG. 8, the decoder 80 further includes a parsing unit 805. The parsing unit 805 is configured to parse a bitstream to obtain an initial predicted residual of the colour component to-be-predicted of the current block.

The second processing unit 802 is further configured to filter the initial predicted residual by using a preset processing mode, according to the reference value of the colour component to-be-predicted of the current block, or the reference value of the colour component to-be-referenced of the current block, or the reference value of the colour component to-be-predicted of the current block and the reference value of the colour component to-be-referenced of the current block, where the preset processing mode includes at least one of: filtering, grouping, value modification, quantization, or de-quantization.

The second obtaining unit 804 is further configured to obtain a target predicted residual according to a result of the filtering.

In the above solution, referring to FIG. 8, the decoder 80 further includes a second constructing unit 806.

The parsing unit 805 is further configured to parse the bitstream to obtain a model parameter of the prediction model.

The second constructing unit 806 is configured to construct the prediction model according to the obtained model parameter, where the prediction model is used to perform cross-component prediction on the colour component to-be-predicted of the current block according to the colour component to-be-referenced of the current block.

In the above solution, referring to FIG. 8, the decoder 80 further includes a second adjusting unit 807. The second adjusting unit 807 is configured to adjust a resolution of the colour component to-be-referenced of the current block when the resolution of the colour component to-be-referenced of the current block is different from a resolution of the colour component to-be-predicted of the current block, where the adjusting includes up-sampling or down-sampling; and update, based on the adjusted resolution of the colour component to-be-referenced, the reference value of the colour component to-be-referenced of the current block to obtain a first reference value of the colour component to-be-referenced of the current block, where the adjusted resolution of the colour component to-be-referenced is the same as the resolution of the colour component to-be-predicted of the current block.

In the above solution, the second adjusting unit 807 is further configured to adjust the reference value of the colour component to-be-referenced of the current block to obtain a first reference value of the colour component to-be-referenced of the current block, when a resolution of the colour component to-be-referenced of the current block is different from a resolution of the colour component to-be-predicted of the current block, where the adjusting includes one of: down-sampling filtering, up-sampling filtering, cascaded filtering of the down-sampling filtering and low-pass filtering, and cascaded filtering of the up-sampling filtering and the low-pass filtering.

In the above solution, the second processing unit 802 is further configured to filter the initial predicted value according to a reference value of the colour component to-be-predicted of the current block and obtain the target predicted value, where the reference value of the colour component to-be-predicted of the current block is obtained by performing characteristic statistics on the colour component to-be-predicted of the picture or the colour component to-be-predicted of the current block.

In the above solution, the second processing unit 802 is further configured to filter the initial predicted value by using a preset processing mode according to the reference value of the colour component to-be-predicted of the current block, where the preset processing mode includes at least one of: filtering, grouping, value modification, quantization, inverse quantization, low-pass filtering, or adaptive filtering.

In the above solution, the parsing unit 805 is further configured to parse the bitstream to obtain an initial predicted residual of the colour component to-be-predicted of the current block.

The second processing unit 802 is further configured to filter the initial predicted residual by using a preset processing mode according to the reference value of the colour component to-be-predicted of the current block, where the preset processing mode includes at least one of: filtering, grouping, value modification, quantization, inverse quantization, low-pass filtering, or adaptive filtering.

In the above solution, referring to FIG. 8, the decoder 80 further includes a second determining unit 808.

The second statistics unit 803 is further configured to perform characteristic statistics on the colour component to-be-predicted of the picture.

The second determining unit 808 is further configured to determine, according to a result of characteristic statistics, a reference value of the colour component to-be-predicted of the current block and a reference value of the colour component to-be-referenced of the current block, where the colour component to-be-referenced is different from the colour component to-be-predicted.

In the above solution, the second processing unit 802 is further configured to filter the initial predicted value by using a preset processing mode, according to the reference value of the colour component to-be-predicted of the current block and the reference value of the colour component to-be-referenced of the current block, where the preset processing mode includes at least one of: filtering, grouping, value modification, quantization, inverse quantization, low-pass filtering, or adaptive filtering.

It can be understood that, in the implementation, a "unit" may be a part of a circuit, a part of a processor, a part of a program, or software, etc., which can be a module or not. In addition, in the implementation, the various components may be integrated into one processing unit, or each unit may be physically present, or two or more units may be integrated into one unit. The above-mentioned integrated unit can be implemented in the form of hardware or a software function unit.

The integrated unit may be stored in a computer readable storage medium when it is implemented in the form of a software functional unit and is sold or used as a separate product. Based on such understanding, implementations provide a computer storage medium. The computer storage medium stores programs for picture prediction which, when executed by the second processor, are configured to implement the method of any of the above implementations.

Figure 9:
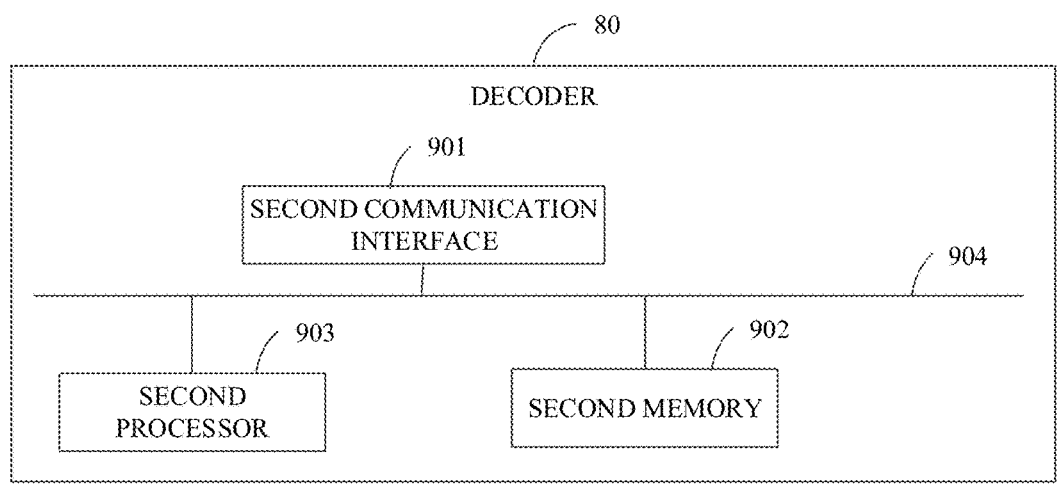
FIG. 9 is a schematic structural diagram of hardware of a decoder according to implementations.

Based on the structure of the decoder 80 and the computer storage medium, FIG. 9 is a schematic structural diagram of hardware of the decoder 80 according to implementations. The decoder 80 may include a second communication interface 901, a second memory 902, and a second processor 903, where various components are coupled together through a second bus system 904. It can be understood that, the second bus system 904 is used to implement connection and communication between these components. In addition to a data bus, the second bus system 904 also includes a power bus, a control bus, and a status signal bus. However, for clarity of description, in FIG. 9, various buses are marked as the second bus system 904.

The second communication interface 901 is used for receiving and sending signals in the process of sending/receiving information to/from other external network elements.

The second memory 902 is configured to store computer programs than can be run on the second processor 903.

The second processor 903 is configured to execute the following when running the computer programs.

An initial predicted value of a colour component to-be-predicted of a current block in a picture is obtained through a prediction model. The initial predicted value is filtered and a target predicted value of the colour component to-be-predicted of the current block is obtained.

In another implementation, the second processor 903 is further configured to execute the method described in any of the foregoing implementations when running the computer programs.

It can be understood that, the functions of the second memory 902 and the first memory 702 are similar, and the functions of the second processor 903 and the first processor 703 are similar, which will not be described in detail herein.

According to the implementation, the decoder is provided and the decoder includes the second prediction unit and the second processing unit. The second prediction unit is configured to obtain an initial predicted value of a colour component to-be-predicted of a current block in a picture through a prediction model. The second processing unit is configured to filter the initial predicted value and obtain a target predicted value of the colour component to-be-predicted of the current block. In this way, after cross-component prediction is performed on the at least one colour component of the current block, the least one colour component is filtered, to balance the statistical characteristics of various colour components after cross-component prediction, thereby improving the prediction efficiency as well as the coding efficiency in video coding.

It is noted that in this application, the terms "including", "containing" or any other variations thereof are intended to cover non-exclusive inclusion. As a result, a process, method, article, or device that includes a series of elements includes not only those elements, but also other elements that are not explicitly listed, or further includes elements inherent to the process, method, article, or device. If there are no more restrictions, the element defined by the sentence "including a . . . " does not exclude the existence of other same elements in the process, method, article, or device that includes the element.

The serial numbers of the foregoing implementations of this application are only for description, and do not represent the superiority of the implementations.

The methods disclosed in the several method implementations of this application can be combined without conflict to obtain new method implementations.

The features disclosed in the several product implementations of this application can be combined without conflict to obtain new product implementations.

The features disclosed in the several method implementations or device implementations of this application can be combined without conflict to obtain new method implementations or device implementations.

The above are some implementations of this application, but the protection scope of this application is not limited thereto. Any changes or substitutions that can be easily conceived by those skilled in the art within the technical scope disclosed by this application should be covered by the protection scope of this application. Therefore, the protection scope of this application should be subject to the protection scope of the claims.

INDUSTRIAL APPLICABILITY

According to the implementations, the initial predicted value of the colour component to-be-predicted of the current block in the picture is obtained through the prediction model. The initial predicted value is filtered and the target predicted value of the colour component to-be-predicted of the current block is obtained. In this way, after cross-component prediction is performed on the at least one colour component of the current block, the least one colour component is filtered, to balance the statistical characteristics of various colour components after cross-component prediction, thereby improving the prediction efficiency. Furthermore, since the target predicted value is closer to the true value, the predicted residual of the colour component is smaller. In this way, less bit rate can be transmitted during coding and the coding efficiency in video coding can also be improved.

What is claimed is:

1. A method for picture prediction, implemented in a decoder and comprising:
    obtaining an initial predicted value of a colour component to-be-predicted of a current block in a picture through a prediction model; and
    filtering the initial predicted value and obtaining a target predicted value of the colour component to-be-predicted of the current block;
    wherein filtering the initial predicted value and obtaining the target predicted value of the colour component to-be-predicted of the current block comprises:
        filtering the initial predicted value by using a preset processing mode, wherein the preset processing mode comprises value modification; and
        obtaining the target predicted value according to a result of the filtering;
    wherein before filtering the initial predicted value by using the preset processing mode, the method further comprises:
    performing characteristic statistics on at least one colour component of the current block;
    wherein filtering the initial predicted value by using the preset processing mode, comprises:
        filtering the initial predicted value according to the result of the characteristic statistics by using the preset processing mode.

2. The method of claim 1, further comprising:
    determining, according to a colour component to-be-referenced of the current block, a reference value of the colour component to-be-predicted of the current block.

3. A method for picture prediction, implemented in an encoder and comprising:
    obtaining an initial predicted value of a colour component to-be-predicted of a current block in a picture through a prediction model; and
    filtering the initial predicted value and obtaining a target predicted value of the colour component to-be-predicted of the current block,
    wherein filtering the initial predicted value and obtaining the target predicted value of the colour component to-be-predicted of the current block comprises:
        filtering the initial predicted value by using a preset processing mode, wherein the preset processing mode comprises value modification; and
        obtaining the target predicted value according to a result of the filtering;
    wherein before filtering the initial predicted value by using the preset processing mode, the method further comprises:
    performing characteristic statistics on at least one colour component of the current block;
    wherein filtering the initial predicted value by using the preset processing mode, comprises:
        filtering the initial predicted value according to the result of the characteristic statistics by using the preset processing mode.

4. The method of claim 3, further comprising:
    determining, according to a colour component to-be-referenced of the current block, a reference value of the colour component to-be-predicted of the current block.

5. An encoder comprising a memory and a processor, wherein
    the memory is configured to store computer programs than can be run on the processor; and
    the processor when running the computer programs is configured to:
        obtain an initial predicted value of a colour component to-be-predicted of a current block in a picture through a prediction model; and
        filter the initial predicted value and obtain a target predicted value of the colour component to-be-predicted of the current block,
    wherein the processor configured to filter the initial predicted value and obtaining the target predicted value of the colour component to-be-predicted of the current block is configured to:
        filter the initial predicted value by using a preset processing mode, wherein the preset processing mode comprises value modification; and
        obtain the target predicted value according to a result of the filtering;
    wherein before filter the initial predicted value by using the preset processing mode, the processor is further configured to perform characteristic statistics on at least one colour component of the current block;
    wherein the processor configured to filter the initial predicted value by using the preset processing mode is further configured to:
        filter the initial predicted value according to the result of the characteristic statistics by using the preset processing mode.

6. The encoder of claim 5, wherein the processor is further configured to:
    determine, according to a colour component to-be-referenced of the current block, a reference value of the colour component to-be-predicted of the current block.

7. A decoder comprising a memory and a processor, wherein
    the memory is configured to store computer programs than can be run on the processor; and
    the processor when running the computer programs is configured to:
        obtain an initial predicted value of a colour component to-be-predicted of a current block in a picture through a prediction model; and
        filter the initial predicted value and obtain a target predicted value of the colour component to-be-predicted of the current block,
    wherein the processor configured to filter the initial predicted value and obtaining the target predicted value of the colour component to-be-predicted of the current block is configured to:
        filter the initial predicted value by using a preset processing mode, wherein the preset processing mode comprises value modification; and
        obtain the target predicted value according to a result of the filtering;

wherein before filter the initial predicted value by using the preset processing mode, the processor is further configured to perform characteristic statistics on at least one colour component of the current block;

wherein the processor configured to filter the initial predicted value by using the preset processing mode is further configured to:

filter the initial predicted value according to the result of the characteristic statistics by using the preset processing mode.

8. The decoder of claim 7, wherein the processor is further configured to:

determine, according to a colour component to-be-referenced of the current block, a reference value of the colour component to-be-predicted of the current block.

* * * * *